(12) United States Patent
Chang et al.

(10) Patent No.: US 10,365,547 B2
(45) Date of Patent: Jul. 30, 2019

(54) DIGITAL MICRO-MIRROR DEVICE WITH A HEAT DISSIPATION STRUCTURE

(71) Applicant: Delta Electronics, Inc., Taoyuan (TW)

(72) Inventors: Meng-Sheng Chang, Taoyuan (TW); Hui-Hsiung Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/688,246

(22) Filed: Aug. 28, 2017

(65) Prior Publication Data
US 2019/0018307 A1    Jan. 17, 2019

(30) Foreign Application Priority Data
Jul. 14, 2017  (CN) ............................ 2017 1 0576290

(51) Int. Cl.
| | |
|---|---|
| G03B 21/16 | (2006.01) |
| G03B 21/28 | (2006.01) |
| G09F 19/18 | (2006.01) |
| G02B 5/08  | (2006.01) |
| G03B 21/00 | (2006.01) |

(52) U.S. Cl.
CPC .............. G03B 21/16 (2013.01); G02B 5/08 (2013.01); G03B 21/008 (2013.01); G03B 21/28 (2013.01); G09F 19/18 (2013.01)

(58) Field of Classification Search
USPC .................................................. 362/296.02
See application file for complete search history.

(56) References Cited

U.S. PATENT DOCUMENTS

| | | | |
|---|---|---|---|
| 6,914,783 B2 * | 7/2005 | Rogers ................. | G03B 21/16 257/706 |
| 7,660,124 B2 * | 2/2010 | Chen .................. | H05K 7/20472 165/80.3 |
| 2009/0086171 A1 | 4/2009 | Sun | |
| 2009/0135564 A1 | 5/2009 | Chen et al. | |
| 2016/0344988 A1 | 11/2016 | Kase et al. | |

OTHER PUBLICATIONS

Office Action dated May 9, 2018 of the corresponding Taiwan patent application.

* cited by examiner

*Primary Examiner* — Rafferty D Kelly
(74) *Attorney, Agent, or Firm* — Chun-Ming Shih; HDLS IPR SERVICES

(57) ABSTRACT

A digital micro-mirror unit is arranged on a circuit board. A digital micro-mirror device mask surroundingly covers the digital micro-mirror unit. A thermo-insulation element is arranged between the digital micro-mirror unit and the digital micro-mirror device mask. The digital micro-mirror unit is thermally insulated against the digital micro-mirror device mask through the thermos-insulation element. A thermoelectric cooler (TEC) is thermally connected to the digital micro-mirror unit. A thermo-conductive body is attached on the hot side of the TEC. Therefore the digital micro-mirror unit can meet temperature requirements of safety standards and avoid reducing its service life.

12 Claims, 6 Drawing Sheets

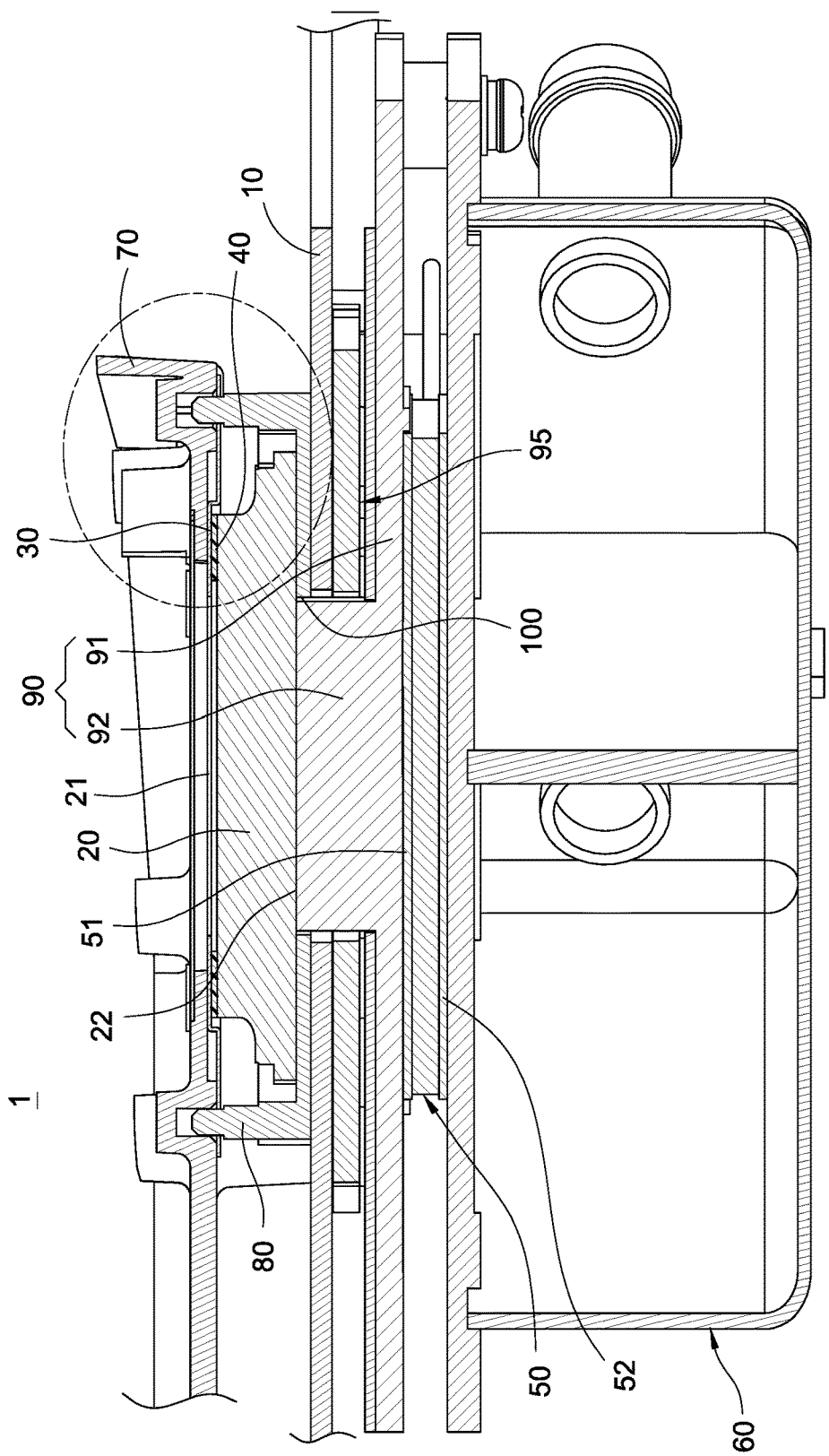

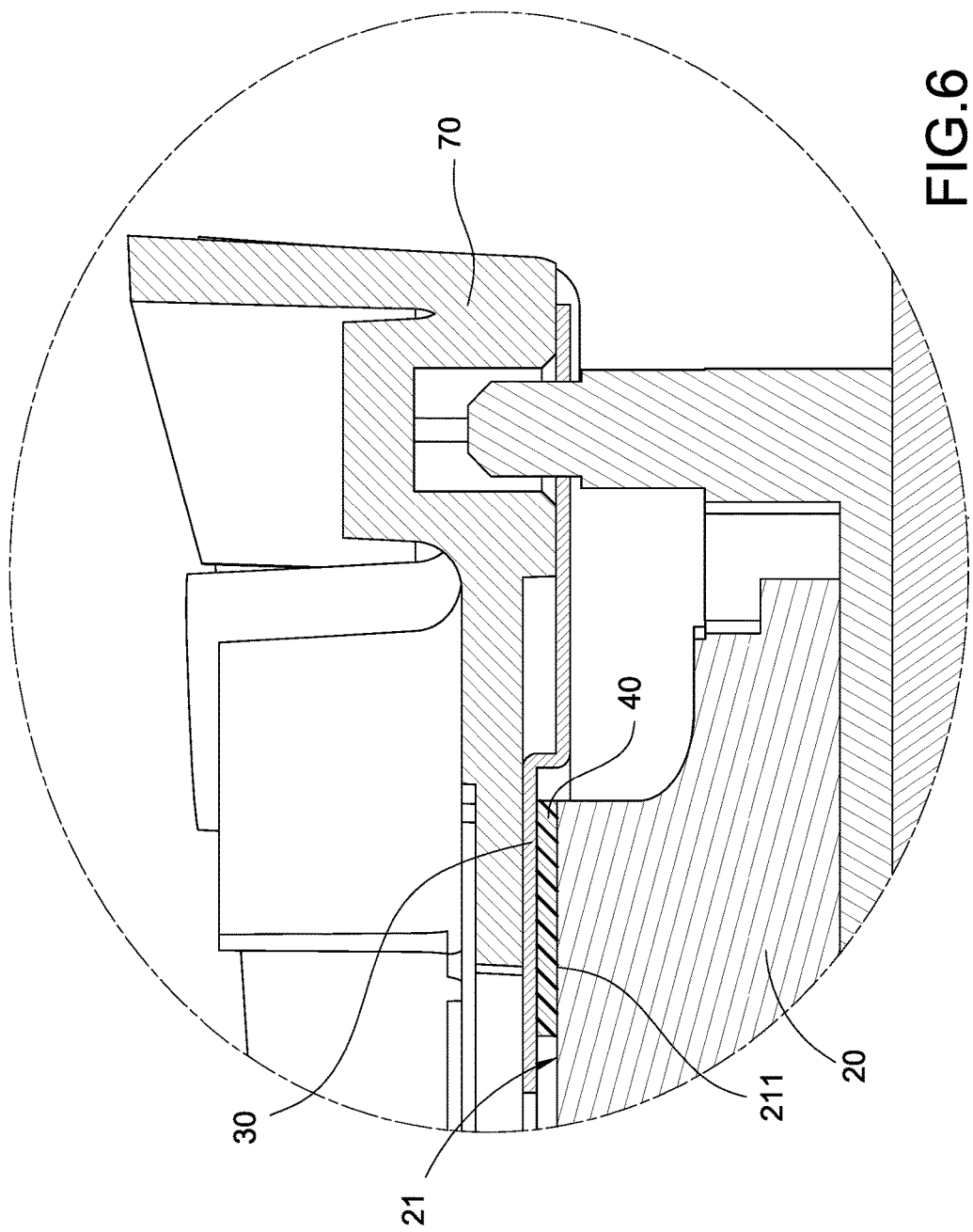

DIGITAL MICRO-MIRROR DEVICE WITH A HEAT DISSIPATION STRUCTURE

BACKGROUND OF THE INVENTION

1. Technical Field

The invention relates to heat dissipation structures, particularly to a digital micro-mirror device with a heat dissipation structure.

2. Related Art

With the development of optical technology and projecting display technology, the Digital Light Processing (DLP) has been a necessary product in visual image. The digital micro-mirror unit of the digital micro-mirror device (DMD) is a primary display unit of the DLP.

When a DLP projector is projecting an image, a large amount of heat will be generated because the light is concentrated on the DMD. How to perform effective heat dissipation to keep great stability of the DMD is an important issue to be solved. Additionally, a DMD mask is arranged between the DMD and system mechanism (the front of the DMD, lit surface), its special black coating can reduce imaging light leakage caused by stray light shooting into the DMD. Furthermore, the DMD mask can help the DMD to dissipate heat.

However, under the condition of high illumination intensity, when the heat dissipation structure arranged behind the DMD dissipates the heat from the DMD to reduce the temperature at the rear of the DMD, the temperature of the front of the DMD and the DMD mask is still relatively high, and the DMD mask is disadvantageous to heat dissipation of the DMD. Further, the temperature difference between the front and the rear of the DMD will exceed the safety standards requirements (the temperature difference between the lit surface and the back surface should be controlled within a specific range). As a result, the service life of the DMD will be shortened.

SUMMARY OF THE INVENTION

An object of the invention is to provide a digital micro-mirror device with a heat dissipation structure, which can dissipate the heat from the digital micro-mirror unit to meet safety standards and avoid reducing service life of the digital micro-mirror unit.

One embodiment of the invention provides a digital micro-mirror device with a heat dissipation structure, which includes a circuit board, a digital micro-mirror unit, a digital micro-mirror device mask, a thermo-insulation element, a thermoelectric cooler (TEC) and a thermo-conductive body. The digital micro-mirror unit is arranged on the circuit board. The digital micro-mirror device mask surroundingly covers the digital micro-mirror unit. The thermo-insulation element is arranged between the digital micro-mirror unit and the digital micro-mirror device mask. The digital micro-mirror unit is thermally insulated against the digital micro-mirror device mask through the thermos-insulation element. The thermoelectric cooler (TEC) is thermally connected to the digital micro-mirror unit. The thermo-conductive body is attached on the hot side of the TEC. The thermo-insulation element can insulate the digital micro-mirror unit from heat transferring from the digital micro-mirror device mask to allow the digital micro-mirror device to meet safety standards and avoid reducing service life of the digital micro-mirror unit.

According to the above configuration of the digital micro-mirror device with a heat dissipation structure, the thermo-insulation element is arranged between the digital micro-mirror unit and the digital micro-mirror device mask so as to form thermal insulation between the digital micro-mirror unit and the digital micro-mirror device mask. The heat from the digital micro-mirror device mask which is lit will not be conducted to the digital micro-mirror unit to influence the temperature of the lit surface of the digital micro-mirror unit. When the TEC and thermo-conductive body dissipates the heat of the digital micro-mirror unit, the temperature difference between the lit surface and the back surface of the digital micro-mirror unit can meet the safety standards to avoid reducing the service life of the digital micro-mirror unit.

BRIEF DESCRIPTION OF THE DRAWINGS

FIG. 5 is a cross-sectional view along line 5-5 in FIG. 4; and

FIG. 6 is a partially enlarged view of FIG. 5.

DETAILED DESCRIPTION OF THE INVENTION

Figure 1:
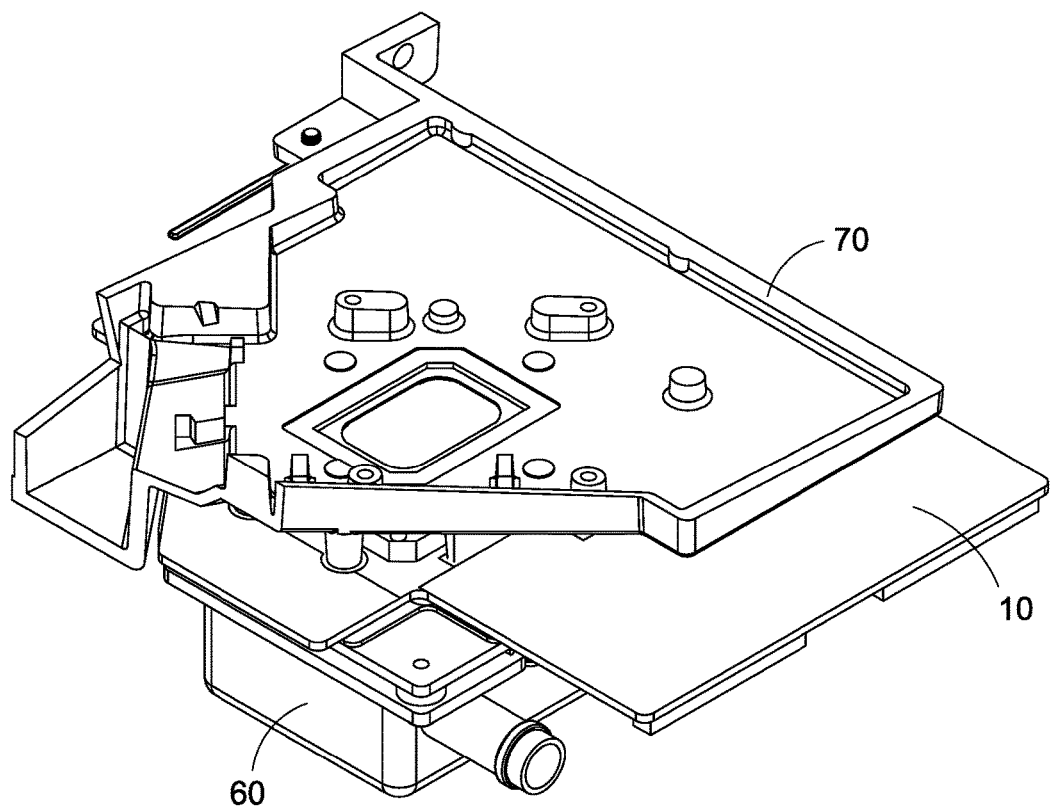
FIG. 1 is a perspective view of the digital micro-mirror device with a heat dissipation structure of one embodiment of the invention.
Figure 2:
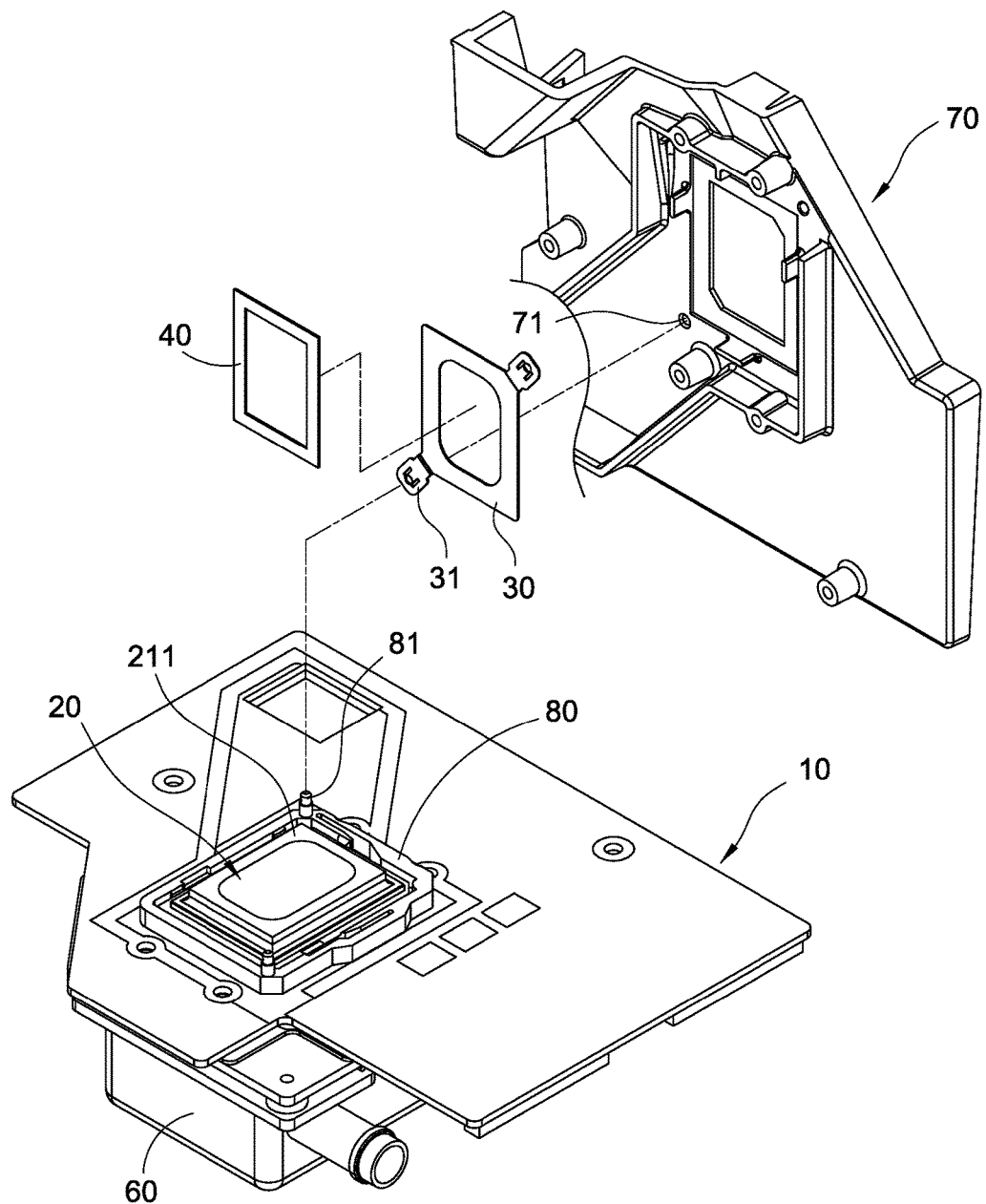
FIG. 2 is an exploded view of the digital micro-mirror device and the support frame of FIG. 1.
Figure 3:
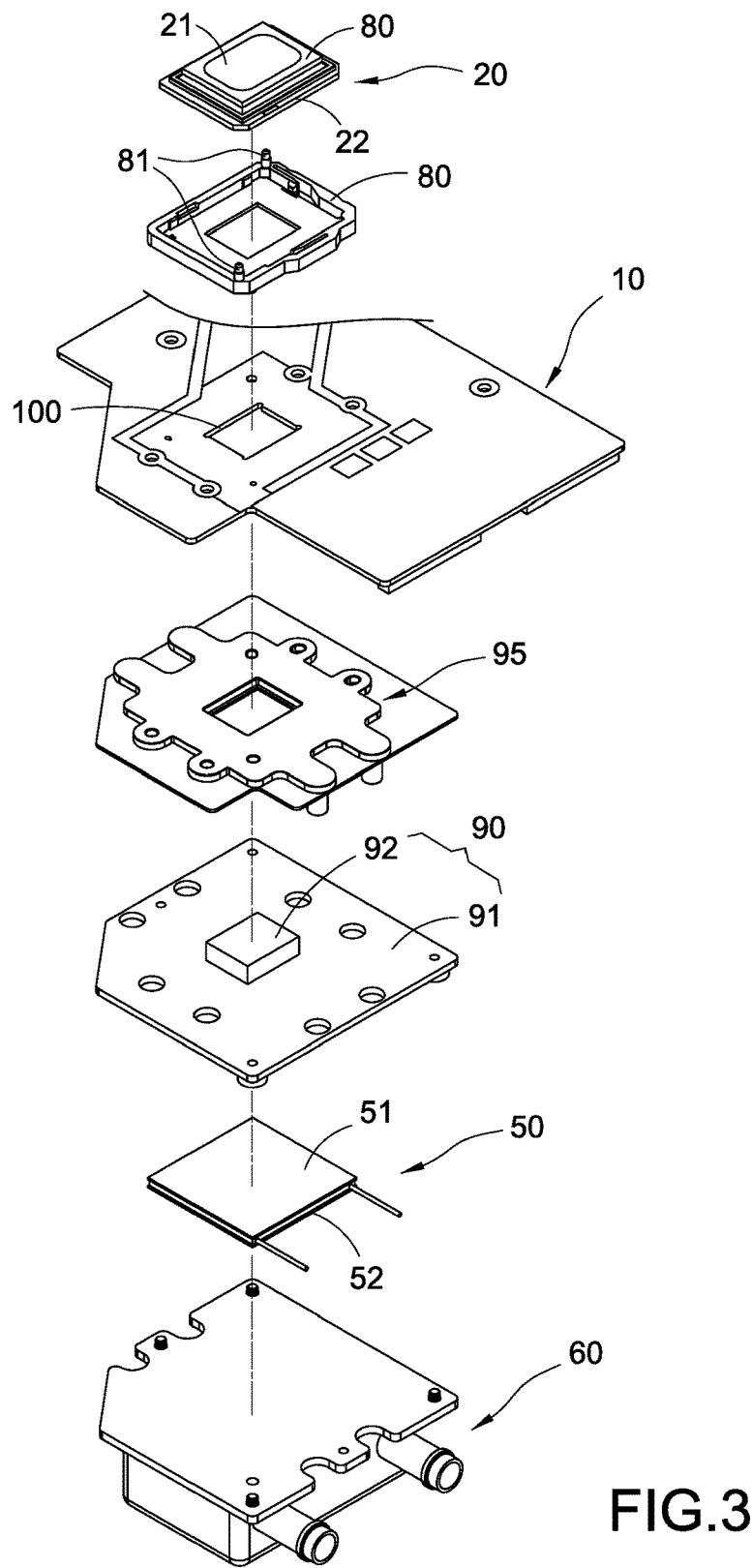
FIG. 3 is an exploded view of the digital micro-mirror device and heat dissipation structure of FIG. 1.

Please refer to FIGS. 1-3, which are a perspective view of the digital micro-mirror device with a heat dissipation structure of one embodiment of the invention, an exploded view of the digital micro-mirror device and the support frame of the embodiment, and an exploded view of the digital micro-mirror device and heat dissipation structure of the embodiment, respectively. The digital micro-mirror device 1 with a heat dissipation structure includes a circuit board 10, a digital micro-mirror unit 20, a digital micro-mirror device (DMD) mask 30, a thermo-insulation element 40, a thermoelectric cooler (TEC) 50 and a thermo-conductive body 60. The digital micro-mirror unit 20, the digital micro-mirror device mask 30 and the thermo-insulation element 40 are arranged on a side of the circuit board 10. The TEC 50 and the thermo-conductive body 60 are arranged on the other side of the circuit board 10. When the TEC 50 and the thermo-conductive body 60 dissipate the heat of the digital micro-mirror unit 20, the thermo-insulation element 40 can insulate the digital micro-mirror unit 20 from heat transferring from the DMD mask 30. This allows the digital micro-mirror unit 20 to meet the safety standards and avoid reducing its service life.

The circuit board 10 is electrically connected to the digital micro-mirror unit 20 and makes signal control to the digital micro-mirror unit 20. In this embodiment, the circuit board 10 has an opening 100. The digital micro-mirror unit 20 is arranged on the opening 100.

The digital micro-mirror unit 20 is mounted on a side of the circuit board 10 corresponding to the opening 100. The digital micro-mirror unit 20 has a lit surface 21 and a back side 22 opposite to the lit surface 21. The back surface 22 faces to the circuit board 10, and the lit surface 21 faces away the circuit board 10. An internal structure and functions of the digital micro-mirror unit 20 are well-known and not features of the invention, so they are not described herein.

The DMD mask 30 covers an outer periphery 211 of the lit surface 21 of the digital micro-mirror unit 20. In addition, a surface of the DMD mask 30 has a special black coating for reducing imaging light leakage caused by stray light shooting into the digital micro-mirror unit 20.

The thermo-insulation element 40 is arranged between the outer periphery 211 of the digital micro-mirror unit 20 and the DMD mask 30. The digital micro-mirror unit 20 is thermally insulated with the DMD mask 30 through the thermos-insulation element 40. Preferably, the thermos-insulation element 40 is made of a thermo-insulative material such as thermo-insulative sponge. In this embodiment, the thermo-insulation element 40 forms a thermal insulation between the digital micro-mirror unit 20 and the DMD mask 30. As a result, the heat from the DMD mask 30 which has been lit will not transfer to the digital micro-mirror unit 20 by conduction to influence the temperature of the lit surface 21 of the digital micro-mirror unit 20.

In detail, as shown in FIG. 2, the digital micro-mirror unit 20 is a cuboid. The DMD mask 30 is a rectangular frame. The thermo-insulation element 40 is a rectangular frame corresponding to the DMD mask 30.

The TEC 50 is a well-known thermoelectric cooler chip which can generate a temperature difference between its two opposite sides. In the embodiment, the TEC 50 is arranged on the other side of the circuit board 10. The TEC 50 has a cold side 51 and a hot side 52. The cold side 51 is thermally connected to the digital micro-mirror unit 20. The thermo-conductive body 60 is attached on the hot side 52 of the TEC 50. In this embodiment, the thermo-conductive body 60 is, but not limited to, a water-cooled head. The thermo-conductive body 60 may be a fin module, too.

In this embodiment, the digital micro-mirror device 1 with a heat dissipation structure of the invention further includes a support frame 70, an installation seat 80, a thermo-conductive element 90 and a support assembly 95. The support frame 70 is located on an outer side of the DMD mask 30 to fasten the circuit board 10 and DMD mask 30. The installation seat 80 is arranged between the circuit board 10 and the support frame 70 to load the digital micro-mirror unit 20. The digital micro-mirror unit 20 is disposed on the circuit board 10 through the installation seat 80.

The thermo-conductive element 90 is arranged between the circuit board 10 and the TEC 50 so that the TEC 50 is thermally connected to the digital micro-mirror unit 20 through the thermo-conductive element 90. In detail, the thermo-conductive element 90 includes a thermo-conductive board 91 and a thermo-conductive block 92 thereon. The thermo-conductive block 92 passes through the opening 100 of the circuit board 10 to attach a side of the digital micro-mirror unit 20. Additionally, the support assembly 95 is arranged between the thermo-conductive element 90 and the circuit board 10.

As shown in FIG. 3, in this embodiment, the installation seat 80 has rods 81 and the support frame 70 has positioning holes 71 corresponding to the rods 81, so that the installation seat 80 can be connected to the support frame 70 by inserting the rods 81 into the positioning holes 71.

In this embodiment, the DMD mask 30 has lugs 31 for being penetrated by the rods 81 of the installation seat 80, so that the DMD mask 30 can be fixed on the support frame 70 through the installation seat 80. Preferably, the rods 81, positioning holes 71 and lugs 31 are arranged diagonally.

Figure 4:
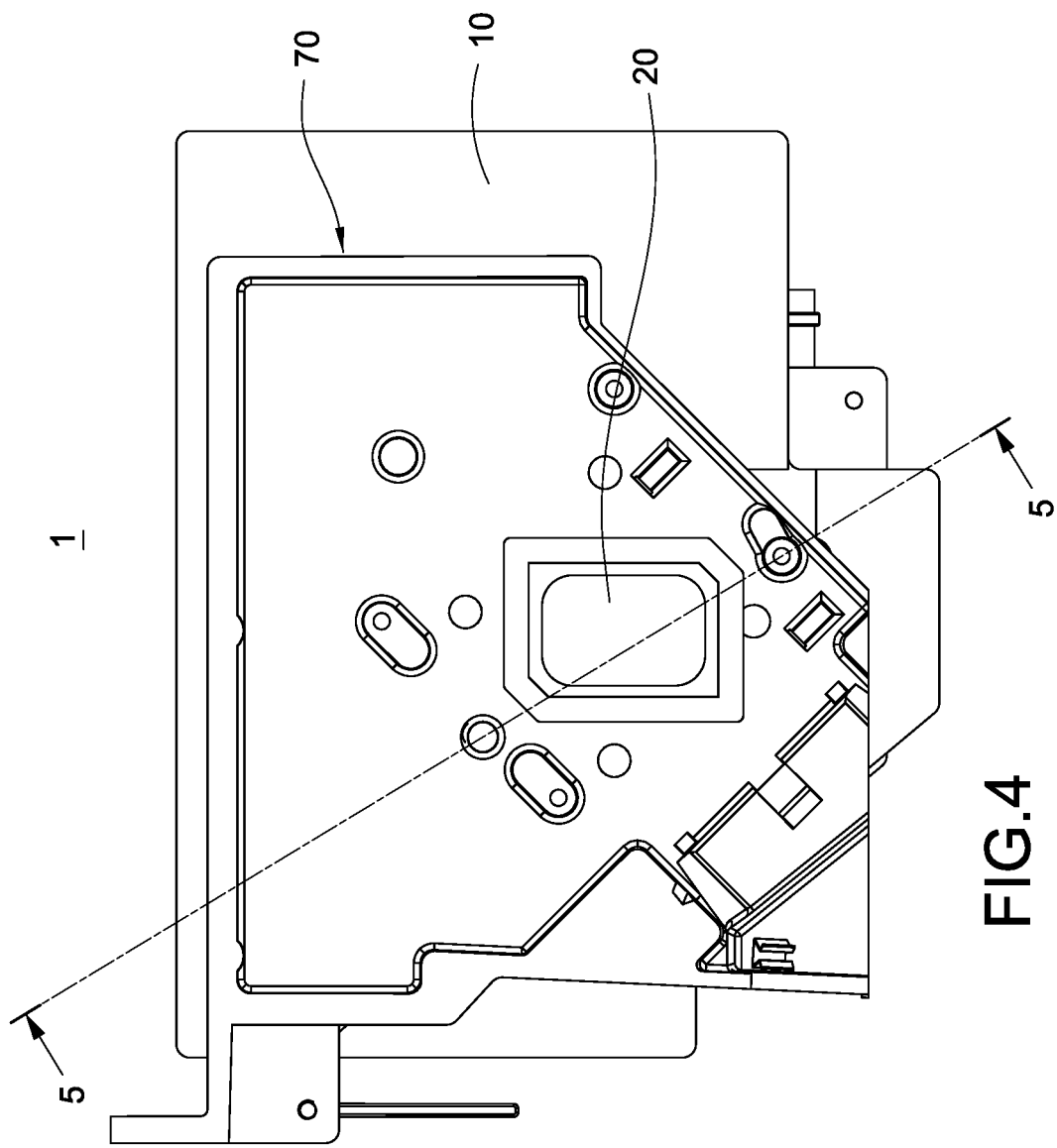
FIG. 4 is a top view of the digital micro-mirror device with a heat dissipation structure of FIG. 1.

Please refer to FIGS. 4-6, which are a top view, a cross-sectional view, and a partially enlarged view of the digital micro-mirror device with a heat dissipation structure of the above embodiment, respectively. As shown in FIG. 5, the thermos-conductive block 92 of the thermos-conductive element 90 passes through the opening 100 of the circuit board 10 to attach a side of the digital micro-mirror unit 20. The support assembly 95 is arranged between the digital micro-mirror unit 20 and the thermos-conductive board 91 to provide support to a side of the circuit board 10, so that the thermos-conductive element 90 can be stably attached on the digital micro-mirror unit 20 to conduct the heat of the digital micro-mirror unit 90 to the TEC 50 through the thermo-conductive element 90.

Please refer to FIG. 6. The thermos-insulation element 40 is arranged between the digital micro-mirror unit 20 and the DMD mask 30 to form a thermal insulation, so that the temperature of the DMD mask 30 will not be conducted to the digital micro-mirror unit 20 to influence the temperature of the lit surface 21 of the digital micro-mirror unit 20. As a result, when the TEC 50 and the thermos-conductive body 60 dissipate the heat of the digital micro-mirror unit 20, the temperature of the back surface 22 of the digital micro-mirror unit 20 will be lowered to meet the safety standards. On the other hand, the thermos-insulation element 40 can insulate the temperature of the DMD mask 30 (the temperature above the digital micro-mirror unit 20) from conducting to the lit surface 21 of the digital micro-mirror unit 20. As a result, the temperature difference of the lit surface 21 and the back surface 22 of the digital micro-mirror unit 20 can be held within a specific range of safety standards to avoid reducing the service life of the digital micro-mirror unit 20.

It will be appreciated by persons skilled in the art that the above embodiment has been described by way of example only and not in any limitative sense, and that various alterations and modifications are possible without departure from the scope of the invention as defined by the appended claims.

What is claimed is:

1. A digital micro-mirror device with a heat dissipation structure, comprising:
   a circuit board, having an opening;
   a digital micro-mirror unit, mounted on a first side of the circuit board corresponding to the opening, and having a lit surface facing away from the circuit board;
   a digital micro-mirror device (DMD) mask covering an outer periphery of the lit surface, wherein a surface of the DMD mask has a black coating for reducing imaging light leakage caused by stray shooting into the digital micro-mirror unit;
   a thermo-insulation element, arranged between an outer periphery of the digital micro-mirror unit and the digital micro-mirror device mask, the digital micro-mirror unit not being directly connecting to the digital micro-mirror device mask such that heat of the digital micro-mirror device mask is not directly conducted to the digital micro-mirror unit;
   a thermoelectric cooler (TEC), arranged on a second side of the circuit board, having a cold side and a hot side, and the cold side being thermally connected to the digital micro-mirror unit, wherein the second side is opposite to the first side; and
   a thermo-conductive body attached on the hot side of the TEC.

2. The digital micro-mirror device with a heat dissipation structure of claim 1, further comprising a support frame on an outer side of the DMD mask for being mounted by the circuit board and the DMD mask.

3. The digital micro-mirror device with a heat dissipation structure of claim 2, further comprising an installation seat loading the digital micro-mirror unit and arranged between the circuit board and the support frame.

4. The digital micro-mirror device with a heat dissipation structure of claim 3, wherein the installation seat has rods, the support frame has positioning holes corresponding to the rods, and the installation seat is connected to the support frame by inserting the rods into the positioning holes.

5. The digital micro-mirror device with a heat dissipation structure of claim 4, wherein the DMD mask has lugs, and the DMD mask is fixed on the support frame through inserting the rods into the lugs.

6. The digital micro-mirror device with a heat dissipation structure of claim 5, wherein the rods, the positioning holes and the lugs are arranged diagonally.

7. The digital micro-mirror device with a heat dissipation structure of claim 1, wherein the digital micro-mirror unit is a cuboid, the DMD mask is a rectangular frame, and the thermo-insulation element is a rectangular frame corresponding to the DMD mask.

8. The digital micro-mirror device with a heat dissipation structure of claim 1, further comprising a thermos-conducive element arranged between the circuit board and the TEC, wherein the TEC is thermally connected to the digital micro-mirror unit through the thermo-conductive element.

9. The digital micro-mirror device with a heat dissipation structure of claim 8, wherein the thermo-conductive element comprises a thermo-conductive board and a thermo-conductive block thereon, and the thermo-conductive block passes through the opening of the circuit board to attach a side of the digital micro-mirror unit.

10. The digital micro-mirror device with a heat dissipation structure of claim 9, further comprising a support assembly arranged between the thermo-conductive element and the circuit board.

11. The digital micro-mirror device with a heat dissipation structure of claim 1, wherein the thermos-insulation element is a thermo-insulative sponge.

12. The digital micro-mirror device with a heat dissipation structure of claim 1, wherein the thermo-conductive body is a water-cooled head or a fin module.

* * * * *